United States Patent [19]

Weipert et al.

[11] 4,093,676

[45] June 6, 1978

[54] ANTISTATIC AGENTS FOR MELT-FORMED POLYMERS

[75] Inventors: Eugene A. Weipert, Allen Park; Charles F. Deck, Trenton, both of Mich.

[73] Assignee: BASF Wyandotte Corporation, Wyandotte, Mich.

[21] Appl. No.: 177,136

[22] Filed: Sep. 1, 1971

[51] Int. Cl.$^2$ .................... C08L 77/00; C08L 75/00; C08L 67/00
[52] U.S. Cl. ............................. 260/857 PG; 260/858; 260/860
[58] Field of Search ................. 260/857 PG, 851 PG, 260/858, 860

[56] References Cited

U.S. PATENT DOCUMENTS 3,657,386   4/1972   Weedon .................... 260/857 PG

FOREIGN PATENT DOCUMENTS 6,906,532   11/1969   Netherlands ................ 260/857 PG

*Primary Examiner*—Paul Lieberman
*Attorney, Agent, or Firm*—Joseph D. Michaels; Bernhard R. Swick; Robert E. Dunn

[57] ABSTRACT

Permanent antistatic properties are imparted to melt-formed polymers by the incorporation therewith of a polymer composition prepared by reacting a hydrogen-reactive compound with an alkylene oxide adduct of a nitrogen-containing compound. Further, the polymer composition may be capped to minimize reaction with the melt-formed polymer.

23 Claims, No Drawings

ANTISTATIC AGENTS FOR MELT-FORMED POLYMERS

BACKGROUND OF THE INVENTION

1. Field of the Invention

The present invention pertains to melt-formed polymers and, in particular, antistatic agents therefor. More specifically, the present invention pertains to permanent antistatic agents for melt-formed polymers which are subsequently used in textiles and the like.

2. Prior Art

In U.S. Pat. Nos. 3,475,898 and 3,329,557 there is disclosed a method for rendering synthetic polymers antistatic by the addition thereto of a high molecular weight poly(alkylene ether) having a molecular weight of from about 1,000 to about 30,000. Generally, these patents teach the addition of the polyether to the polymer melt just prior to spinning the polyether into fibers, filaments and the like. This point of introduction is used to minimize thermal degradation of the polyether which, because of the high temperature of the polymer melt, would otherwise occur.

Further, U.S. Pat. No. 3,475,898 states that when large amounts of lower molecular weight polyethers are employed as antistatic agents for polyamides, it is advantageous to use a thickening agent when the polyether is added to the polyamide melt to avoid separation into layers.

The present invention seeks to improve upon such poly (alkylene ethers) by providing new antistatic agents which do not suffer the deficiencies of thermal degradation and insufficient viscosity.

SUMMARY OF THE INVENTION

In accordance with the present invention melt-formed polymers have permanent antistatic properties imparted thereto by the addition thereto of a polymer composition which is the reaction product of hydrogen-reactive compound selected from the group of organic polyisocyanate and alkyl ester of dicarboxylic acid and an alkylene oxide adduct of a nitrogen-containing compound.

The polymer composition may be further reacted with suitable reactants to tailor the antistatic agent or composition for use in a specific polymer melt.

The antistatic agents disclosed herein are thermally stable at the temperature of the melt and are of sufficient viscosity to negate any use of supplemental thickening agents or the like.

For a more comprehensive discussion of the present invention reference is made to the following detailed description and examples thereof.

DESCRIPTION OF THE PREFERRED EMBODIMENT

The present invention generally provides new antistatic agents for melt-formed polymers which generally comprise the reaction product of a hydrogen-reactive compound and an alkylene oxide adduct of a nitrogen-containing compound. These antistatic agents generally have a molecular weight ranging from about 25,000 to 500,000 and are thermally stable at temperatures of upwards of about 250° to 300° C.

By the term "melt-formed polymers" as used herein is meant synthetic, linear condensation or addition polymers which can be formed into filaments, sheets, or other configurations from the melt without any significant polymer degradation. Examples of such polymers are polyamides, polyesters, polyacrylics and the like, and in particular the polyamides and polyesters.

The melt-formed polyamides are generally prepared from polymerizable monoamino monocarboxylic acids, or from their amide-forming derivatives, e.g. caprolactam, or from suitable diamines and suitable dicarboxylic acids, or from amide-forming derivatives of these compounds. Typical of such polyamides is the reaction product of hexamethylene diamine and adipic acid (NYLON 66).

The presently known melt-formed polyesters to which the present invention is directed are, conventionally, synthetic linear condensation polyesters of bifunctional ester-forming compounds wherein at least 75% of the repeating structural units of the polymer chain includes at least 1 divalent carbocyclic ring containing at least 6 carbon atoms present as an integral part of the polymer chain and having a minimum of four carbon atoms between the points of attachment of the ring in the polymer chain. Representative of such compounds are the reaction products of dicarboxylic acids, such as, terephthalic acid, 1,4-cyclohexane dicarboxylic acid, tetrachlorophthalic anhydride and the like, and dihydroxy compounds, i.e. glycols, such as, ethylene glycol, propylene glycol, diethylene glycol, triethylene glycol, 1,4-dihydroxymethylcyclohexane, and the like.

It is to be understood that the above-provided description of the melt-formed polymers is only exemplative, rather than limitative of the types of synthetic melt-formed polymers contemplated by the present invention. It is contemplated that the present invention will work with equal efficacy with all melt-formed polymers.

The melt-formed polymer is generally prepared by a spinning process which includes melting the polymer, extruding the polymer melt in the form of a continuous monofilament by forcing the molten polymer through a spinneret at a temperature ranging from about 200° to 300° C. and, thereafter, drawing the resolidified polymer over tensioned rollers.

As hereinbefore stated, the present antistatic agents do not thermally degrade at the elevated temperatures at which the polymer melt is extruded.

The hydrogen-reactive compounds which are employed to prepare the present antistatic agents are selected from the group consisting of organic polyisocyanates and alkyl esters of dicarboxylic acids.

The organic polyisocyanates useful in the practice of the present invention are, preferably, organic diisocyanates which can be either aliphatic, cycloaliphatic, aromatic, alkylaryl and aralkyl diisocyanates. Representative aliphatic diisocyanates include for example, hexamethylene diisocyanate, ethylene diisocyanate and the like. Suitable cycloaliphatic diisocyanates include hydrogenated methylene diphenyldiisocyanate or the isomers of methylcyclohexane diisocyanate. Effective aromatic diisocyanates include 2,4-toluene diisocyanate; 2,6-toluene diisocyanate; isomeric mixtures of 2,4- and 2,6-toluene diisocyanate; crude toluene diisocyanate; xylene diisocyanate and the polymeric isocyanates resulting from phosgenation of aniline-formaldehyde condensation products. These isocyanate compounds are generally prepared by the phosgenation of the corresponding amine in accordance with well-established procedures familiar to the skilled artisan.

The preferred isocyanate compounds are an 80:20 weight mixture of 2,4- and 2,6-toluene diisocyanate and hydrogenated methylene diphenyldiisocyanate.

The alkyl esters of dicarboxylic acids used in the present invention can be represented as:

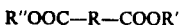

wherein R is the organic portion of the dicarboxylic acid which may be either aliphatic or aromatic, R' and R" are, each, individually, alkyl having from one to four carbon atoms, or hydroxyalkyl having from two to four carbon atoms. Suitable aliphatic dicarboxylic acids are those having from 2 to 10 carbon atoms in the aliphatic portion and which include, for example, oxalic acid, malonic acid, succinic acid, glutaric acid, adipic acid, pimelic acid, suberic acid, azelaic acid, and sebacic acid. Suitable aromatic dicarboxylic acids include phthalic acid, isophthalic acid, terephthalic acid, and hydrogenated terephthalic acid (1,4-cyclohexane dicarboxylic acid), tetrachlorophthalic anhydride and the like. Suitable R' and R" groups are methyl, ethyl, propyl, isopropyl, isobutyl, n-butyl, t-butyl, 2-hydroxyethyl, 2-hydroxypropyl and the like.

Illustrative of the esters useful herein are, for example, dimethyl oxalate, diethyl oxalate, bis (2-hydroxyethyl) oxalate, and the like; dimethyl maleate, diethyl maleate, dibutyl maleate, and the like; bis (2-hydroxyethyl) succinate, diethyl succinate, dibutyl succinate, and the like; diethylphthalate, bis (2-hydroxyethyl) phthalate; and the like; and so forth.

The preferred alkyl esters of dicarboxylic acids are those derived from terephthalic acid and which can be represented as:

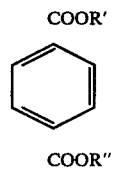

wherein R' and R" have the same meaning ascribed above. Representative of these preferred esters are, for example, dimethyl terephthalate, diethyl terephthalate, bis (2-hydroxyethyl) terephthalate, and the like, and in particular dimethyl terephthalate.

The nitrogen-containing compound which is oxyalkylated is selected from the group consisting of alkanolamines, polyalkanolamines, alkylene polyamines, polyalkylenepolyamines, and aromatic polyamines. Useful alkanolamines include, for example, ethanolamine, propanolamine, isopropanolamine, butanolamine and the like; polyalkanolamines, such as, triethanolamine, triisopropanolamine, stearyldiethanolamine and the like; alkylene polyamines such as ethylene diamine, hexamethylenediamine and the like; polyalkylene polyamines, such as diethylene triamine, triethylene tetramine; aromatic polyamines, such as, the phenylene diamines, toluene diamines, or aniline/formaldehyde condensation polymers.

Among these useful nitrogen-based compounds particularly preferred are those derived from alkylene polyamines, polyalkanolamines and polyalkylene polyamines, and within these classes, ethylene diamine, triethanolamine and triethylenetetramine.

Still another useful class of nitrogen-containing compounds are the higher alkylene oxide adducts of the above-enumerated nitrogen-containing compounds. For purposes of clarity these higher alkylene oxides are hereinafter referred to as α-olefin oxides. The adducts prepared from the α-olefin oxides are generally made by reacting any of the above-enumerated nitrogen-containing compounds under conventional oxyalkylation conditions with the α-olefin oxide. The useful α-olefin oxides are those having from 10 to 20 carbon atoms, and preferably from 14 to 18 carbon atoms, as well as mixtures thereof.

This class of nitrogen-containing compound is prepared, generally, in a mole ratio of α-olefin oxide to nitrogen-containing compound ranging from about 1:1 to 2:1. Preferred within this class of compounds are the $C_{15}$ to $C_{18}$, or mixtures thereof, adducts of ethanolamine, diethanolamine, and aminoethylethanolamine.

The alkylene oxide used to oxyalkylate the nitrogen-containing or nitrogeneous compound can be either ethylene oxide or a mixture of ethylene oxide and lower alkylene oxides, having from 3 to 4 carbon atoms, such as, propylene oxide, the butylene oxides, epihalohydrins, and the like wherein the ethylene oxide is present in an amount equal to at least 25% by weight of an alkylene oxide combination. Where a combination of alkylene oxides is employed, the alkylene oxides can be reacted with the nitrogen-containing compound either sequentially or as a random mixture thereof.

The alkylene oxides generally constitute from about 60 to 99% by weight of the resulting adduct, and preferably, from about 70 to 98% by weight thereof with the ethylene oxide content of the alkylene oxide, ranging from about 20 to 100% by weight of the alkylene oxides and preferably from about 40 to 80% by weight to ensure that the resulting product is hydrophilic.

The alkylene oxide adducts of the nitrogen-containing compound are prepared under conventional oxyalkylation conditions, e.g. 34 to 90 psi and at 100° to 175° C. and in the presence of a conventional oxyalkylation catalyst.

The alkylene oxide adducts of the nitrogen-containing compound, useful herein besides having the above physical properties, have a molecular weight ranging from about 1,000 to 40,000 and preferably from about 5,000 to 30,000.

Particularly suitable alkylene oxide adducts of nitrogen-containing compounds useful in the practice of the present invention are found in U.S. Pat. Nos. 3,207,791 and 2,979,528.

In preparing the antistatic agents, the hydrogen-reactive compound is reacted with the alkoxylated nitrogen-containing compound in a respective mole ratio ranging from about 0.5/1.0 to 1.0/1.0 and, preferably from about 0.7/1.0 to 0.95/1.0. This reaction is usually conducted in an inert atmosphere, e.g. nitrogen, at a temperature ranging from about 60° to 160° C. and at either atmospheric pressure or a reduced pressure, the reduced pressure being preferred when using the alkyl ester, for a time period ranging from about 1 to 4 hours. Preferably, the reaction is carried out at a temperature ranging from about 70° to 150° C. and for a period ranging from about 1 to 2 hours.

In so preparing these products a catalyst may be employed. Suitaable catalysts are either transesterification catalysts, which include, for example, sodium hydroxide, potassium hydroxide and the like or isocyanate reaction catalysts which are the conventional organo-metallic catalysts, such as, dibutyltin dilaurate, stannous octoate, and the like. The catalyst will nominally be employed in catalytic amounts ranging from about 0.01 to .2 parts per 100 parts by weight of reactants.

Where a transesterification catalyst is employed, it is incumbent to neutralize any residual amounts thereof, by known conventional procedures, after cessation of the reaction.

When the alkylene oxide adducts are reacted with either the organic polyisocyanate or the alkyl ester within the above-described parameters, the resulting product will range from either a viscous liquid product to a hard wax. The hard wax upon subjecting to heat or elevated temperatures, will transform to a highly viscous liquid which for illustrative purposes will have a viscosity at 100° C. ranging from about 200 cps to about 40,000 cps, the same viscosity range being applicable to the viscous liquid products.

Although the herein-described antistatic agents are efficacious with the melt-formed polymers hereinbefore defined, owing to the peculiar nature of the synthetic, melt-formed ester polymers, it is somewhat disadvantageous to introduce into the melt any remaining unreacted hydroxyl groups. Thus, to render the antistatic agents eminently useful with polyester melts, and to minimize interaction with the polyester, it is contemplated that the polymeric antistatic agent composition hereof be subsequently reacted with an aromatic carboxylic acid or an ester thereof.

This latter reaction generally proceeds at a temperature ranging from about 80° to 180° C. for a period ranging from about one to six hours. Preferably, the reaction proceeds at a temperature ranging from about 100° to 150° C. for a period ranging from about 1 to 2 hours.

The acid or ester is employed in an amount ranging from about 0.5 to 4 moles per equivalent of hydroxyl groups in the antistatic polymer.

The antistatic agents of the present invention are generally deployed in an amount ranging from about one to ten percent by weight, based on the weight of the polymer melt. Preferably, from about two to six percent by weight of antistatic agent, based on the weight of the polymer melt is utilized.

The antistatic agent is incorporated into the polymer at any convenient point prior to spinning the monofilament, such as directly into the polymer melt or even at the monomer stage since the present antistatic agents do not interfere with the polymer formation; and in any conventional form, such as in solid or molten form or in a solvent which is subsequently stripped out.

Filaments treated in accordance herewith, and which are usually employed in the preparation of textile products, are rendered permanently antistatic in charge.

For a more complete understanding of the present invention, reference is made to the following, non-limiting examples thereof. In the examples, all parts are by weight absent indications to the contrary.

The viscosity measurements tabulated in the examples were all taken on a Brookfield Viscometer.

EXAMPLE I

This example illustrates the preparation of an antistatic agent embodied by the present invention.

To a two-liter, round-bottom flask equipped with stirring and heating means was charged 1500 parts of an ethylene oxide adduct of a condensation product of propylene oxide and ethylene diamine, the condensation product having an average molecular weight of about 6500 to 7000 and the resulting adduct containing about 40% by weight of ethylene oxide. This material has a viscosity of 200 cps at 100° C. While the material was being stirred at about 70° to 75° C., 10.5 parts of an 80:20 weight mixture of 2,4- and 2,6-toluene diisocyanate was added and the resulting mixture was then heated and stirred for an additional hour.

One hundred and four parts of the product were removed from the flask and this product was found to have a viscosity of 490 cps at 100° C.

EXAMPLE II

To the residue remaining in the flask of Example I was added an additional 4.9 parts of the same diisocyanate. After continuing the reaction for an additional hour, 105 parts of the resulting product were removed from the flask. This product had a viscosity of 680 cps at 100° C.

EXAMPLE III

To the residue in the flask of Example II was added an additional 4.6 parts of the same diisocyanate. This was reacted with the residue for one hour at about 70° to 75° C. A 104 part sample of the resulting product was then removed from the flask and was found to have a viscosity of 1490 cps at 100° C.

EXAMPLE IV

To a five-liter, round-bottom flask equipped with heating means, stirring means, evcuation means and distillation means was charged 3640 parts of the alkylene oxide adduct of ethylene diamine described in Example I and 3.2 parts of powdered potassium hydroxide. With stirring, the mixture in the flask was heated to about 120° C. under 2mm Hg pressure until a near-homogeneous mix was obtained. The vacuum was then relieved with a nitrogen atmosphere and 40 parts of dimethyl terephthalate was added to the flask. The vacuum was then restarted and with stirring, heating was resumed until the temperature in the flask reached 145° C. and methanol began to distill off. The temperature was maintained thereat for one hour after which methanol ceased to distill off. The catalyst was then neutralized with phosphoric acid and water was stripped off at about 115° to 120° C. and the finished product was recovered.

The finished product had a viscosity of 1600 cps at 100° C.

EXAMPLE V

Using the same equipment described in Example IV, 3825 parts of the alkylene oxide adduct of ethylene diamine of Example I was charged into the flask. Two parts of powdered potassium hydroxide was added thereto and the mixture was heated at about 115°-120° C. under 2mm Hg for about 0.5 hours. Thereafter, under a nitrogen atmosphere, vacuum relief, and at about 120° C. 55 parts of dimethyl terephthalate was added to the reaction vessel. After the addition was finished, the vacuum was reinstated and the reactants, with stirring, were gradually heated from about 135° C. to about 150° C. for a two hour period during which time methanol was distilled off. The reactor was then cooled to about 100° C., the catalyst neutralized with 2.5 parts phosphoric acid; the reaction product stripped, and the final product recovered.

The final product had a viscosity of about 7500 cps at about 100° C.

EXAMPLE VI

Example V was repeated using 3935 parts of the alkylene oxide adduct of ethylene diamine of Example I; 3 parts potassium hydroxide and 60 parts of dimethyl terephthalate. The final product had a viscosity of about 17,500 cps at about 100° C.

EXAMPLE VII

Using the same equipment and alkylene oxide adduct of ethylene diamine as in Example I, 3820 parts of this nitrogen-containing compound was charged into the vessel where it was stripped of any water at about 2mm Hg and 110° C. for about 0.5 hours.

The stripped product was then cooled to 50° C and 1.15 parts of dibutyltin dilaurate catalyst was added thereto. Then, with stirring, 40.2 parts of hydrogenated methylene diphenyl diisocyanate (HYLENE W) at about 60° C. was added dropwise to the vessel. The contents of the vessel were then heated, with stirring, up to about 100° C, and was maintained thereat for about 1.5 hours.

The resulting product had a viscosity of about 1150 cps at 100° C.

EXAMPLE VIII

To a reaction vessel equipped with heating, evacuation and stirring means was charged 4054 parts of an alkoxylated nitrogen-containing compound prepared by reacting a mixture of $C_{15}$ to $C_{18}$ α-olefin oxides, the mixture containing about 20% $C_{15}$; 30% $C_{16}$; 30% $C_{17}$ and 20% $C_{18}$, with ethanolamine in a 2:1 mole ratio under conventional oxyalkylation conditions followed thereafter by the ethoxylation of the olefin oxide-diethanolamine condensate. This alkoxylated nitrogen-containing compound has a molecular weight of about 2600 and contains about 80% by weight of ethylene oxide.

After stripping the alkoxylate at about 50° C. for about 0.5 hours at 2mm Hg vacuum, a nitrogen atmosphere was applied to the flask. Then, 1.2 parts of dibutyltin dilaurate catalyst was added to the alkoxylated nitrogen-containing compound. Then, with stirring, 224 parts of hydrogenated methylene diphenyldiisocyanate was added to the reaction vessel at 50° C.

While maintaining the stirring, a 2mm Hg vacuum was applied and the mixture in the vessel was slowly heated to about 110° C. and was maintained thereat for about two hours to ensure complete reaction.

The final product had a viscosity of 580 cps at about 105° C.

EXAMPLE IX

This example illustrates the antistatic properties imparted to nylon by the present invention.

A series of nylon films were prepared having the antistatic agents of the present invention incorporated therewith. The antistatic agent-containing films were prepared by either of two methods.

The first method comprised placing about 25 parts of polyhexamethylene adipamide (NYLON 66) chips in a shallow dish disposed atop a heating plate. To the dish was then added the desired amount of additive. The mixture in the dish was then slightly heated to melt the additive and tumbled around until the additive was uniformly distributed over the chips. The coated chips were then pressed into films in Pasadena Hydraulic Press.

The second method utilized comprised an extension of the first method. In this method, instead of directly pressing the coated chips into a film, about 8 parts of the coated chips were placed in a test tube maintained under a nitrogen atmosphere and having a wire stirrer disposed therein.

The chips were melted down and the viscous mixture was stirred until a uniform dispersion of additive in the polymer melt was obtained.

This dispersion of additive in melt was then pressed into films using the Pasadena Hydraulic Press.

The films prepared by either method were then clamped between two conductive metals and tested for resistance using an apparatus such as is described in AATCC Test Method 76-1964.

The results of these tests are as follows:

| Additive | Amount | Resistivity,* Ohms per square × $10^{12}$ |
| --- | --- | --- |
| — | None | 140.0 |
| Example IV | 5% | 63.0 |
| Example IV | 5% | 0.3 |
| Example IV | 5% | 2.6 |
| Example VI | 5% | 2.8 |
| Example VI | 5% | 3.5 |
| Example V | 5% | 0.04** |
| Example IV | 2.5% | 19.0 |
| Example V | 2.5% | 2.1 |
| Example V | 2.5% | 25.0 |
| Example VII | 2.5% | 0.4 |
| Example VII | 2.5% | 5.3** |
| Example VII | 2.5% | 1.0 |
| Example VIII | 2.5% | 17.0 |
| Example VIII | 2.5% | 0.1 |
| Example VIII | 2.5% | 0.3** |
| Example VIII | 2.5% | 19.0** |

*These values are averages of several readings.
**These films prepared by the second method.

EXAMPLE X

Example IX was repeated using polyethylene terephthalate polyester chips in lieu of the nylon chips. The results of these tests are set forth hereinafter. In this example, all the films were prepared by the first method described in Example IX.

| Additive | Amount | Resistivity, Ohms per square × $10^{12}$ |
| --- | --- | --- |
| — | None | 240.0 |
| Example IV | 2.5% | 0.6 |
| Example IV | 2.5% | 1.2 |
| Example V | 2.5% | 3.5 |
| Example V | 2.5% | 4.2 |
| Example VII | 2.5% | 1.6 |
| Example VII | 2.5% | 7.6 |
| Example VIII | 2.5% | 0.4 |
| Example VIII | 2.5% | 0.4 |

It can be seen from both examples, IX and X, that the present polymeric antistatic agent compositions have a pronounced effect on the electrical resistivity of melt-formed polymers.

We claim:

1. A method for rendering a melt-formed polyamide and polyester polymer antistatic comprising:
   incorporating with the polymer between about 1% and about 10% by weight based on the weight of said polymer of a polymeric composition which comprises the reaction product of
   (a) a hydrogen reactive compound selected from the group consisting of
   (1) organic polyisocyanate and
   (2) alkyl ester of a dicarboxylic acid with (b) an alkylene oxide adduct of a nitrogen-containing compound having a molecular weight of at least 1,000, the ratio of (a) to (b) being from about 0.5:1.0 to 1.0:1.0.

2. The method of claim 1 wherein the nitrogen-containing compound is selected from the group consisting of alkanolamine, polyalkanolamine, alkylene polyamine, polyalkylenepolyamine, aromatic polyamine and α-olefin oxide adducts thereof.

3. The method of claim 1 wherein the polymeric composition is subsequently reacted with an aromatic carboxylic acid or ester in an amount ranging from about 0.5 to 4.0 moles of acid or ester per hydroxyl equivalent of the polymeric composition at a temperature ranging from about 80° to 180° C. for about 1 to 6 hours.

4. The method of claim 3 wherein the melt-formed polymer is a polyester.

5. The method of claim 1 wherein the polymeric composition has a molecular weight ranging from about 25,000 to 500,000 and the alkylene oxide adduct of the nitrogen-containing compound has a molecular weight of from about 1,000 to 40,000, the hydrogen-reactive compound and alkylene oxide adduct being reacted in a respective mole ratio of about 0.5/1.0 to 1.0/1.0 at a temperature of from about 60° to 160° C. for about one to four hours.

6. The method of claim 5 wherein the polymeric composition is subsequently reacted with an aromatic carboxylic acid or ester in an amount ranging from about 0.5 to 4.0 moles of acid or ester per hydroxyl equivalent of the polymeric composition at a temperature ranging from about 80° to 180° C. for about one to six hours.

7. The method of claim 5 wherein the hydrogen-reactive compound is an organic polyisocyanate.

8. The method of claim 7 wherein the organic polyisocyanate is selected from the group consisting of toluene diisocyanate and hydrogenated methylene diphenyldiisocyanate.

9. The method of claim 7 wherein the polymeric composition is prepared in the presence of from about 0.01 to 0.2 parts by weight of an isocyanate reaction catalyst per 100 parts by weight of the reactants.

10. The method of claim 5 wherein the hydrogen-reactive compound is an alkyl ester of dicarboxylic acid.

11. The method of claim 10 wherein the polymeric composition is prepared in the presence of from about 0.01 to 0.2 parts by weight of a transesterification catalyst per 100 parts by weight of the reactants.

12. The method of claim 10 wherein the alkyl ester of dicarboxylic acid is selected from the group consisting of dimethyl terephthalate, diethyl terephthalate and bis(2-hydroxyethyl) terephthalate.

13. The method of claim 1 wherein the nitrogen-containing compound is selected from the group consisting of ethylene diamine and diethanolamine.

14. A fiber-forming polyamide and polyester polymer having incorporated therewith from about one percent to ten percent by weight, based on the weight of the polymer, of an antistatic agent which is the reaction product of
(a) an alkyl ester of a dicarboxylic acid and
(b) an alkylene oxide adduct of a nitrogen-containing compound, having a molecular weight of at least 1,000,
the ratio of (a) to (b) being from about 0.5:1.0 to 1.0:1.0.

15. The polymer of claim 14 wherein (a) is dimethyl terephthalate.

16. The polymer of claim 14 wherein the nitrogen-containing compound is a propylene oxide adduct of ethylene diamine.

17. The polymer of claim 14 wherein (a) is dimethyl terephthalate and (b) is an ethylene oxide adduct of a propylene oxide adduct of ethylene diamine.

18. A method for rendering a fiber-forming polyamide and polyester polymer antistatic comprising:
incorporating with the polymer a polymeric composition comprising the reaction product of
(a) an alkyl ester of a dicarboxylic acid and
(b) an alkylene oxide adduct of a nitrogen-containing compound, having a molecular weight of at least 1,000,
the ratio of (a) to (b) being from about 0.5:1.0 to 1.0:1.0.

19. The method of claim 18 wherein (a) is dimethyl terephthalate.

20. The method of claim 18 wherein the nitrogen-containing compound is a propylene oxide adduct of ethylene diamine.

21. The method of claim 18 wherein (a) is dimethyl terephthalate and (b) is an ethylene oxide adduct of a propylene oxide adduct of ethylene diamine.

22. An antistatic fiber forming polyamide composition containing between about 1% and about 10% by weight based on the weight of the polyamide, of the polymeric reaction product of
(A) an organic amine compound derived from the adduct of an amine having at least one primary amine group with at least one alkylene oxide having 2 to 4 carbon atoms with
(B) a chain extending member yielding the following individual radical

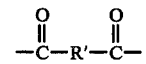

wherein R' is a divalent radical, the ratio of the chain extending compound to the alkylene oxide-amine adduct being from about 0.5/1 to 1.0/1.0, said organic amine adduct having a molecular weight in excess of 1,000, prior to coupling.

23. An antistatic fiber forming polyamide composition containing between about 1% and 10% by weight based on the weight of the polyamide of the polymeric reaction product of
(A) an organic compound derived from the adduct of an amine having at least one primary amine group with at least one alkylene oxide having two to four carbon atoms with
(B) a chain extending member yielding the following individual radical

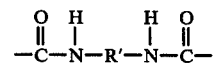

wherein R' is a divalent radical, the ratio of the chain extending compound to the alkylene oxide-amine adduct being from 0.5/1.0 to 1.0/1.0, said organic compound having a molecular weight in excess of 1,000, prior to coupling.

* * * * *